(12) United States Patent
Taheri Amlashi

(10) Patent No.: US 10,690,119 B2
(45) Date of Patent: Jun. 23, 2020

(54) OFFSHORE WIND TURBINE

(71) Applicant: Houman Taheri Amlashi, London (GB)

(72) Inventor: Houman Taheri Amlashi, London (GB)

(73) Assignee: Windbuoyy AG, Berlin (DE)

( * ) Notice: Subject to any disclaimer, the term of this patent is extended or adjusted under 35 U.S.C. 154(b) by 464 days.

(21) Appl. No.: 15/108,649

(22) PCT Filed: Dec. 23, 2014

(86) PCT No.: PCT/GB2014/000524
§ 371 (c)(1),
(2) Date: Jun. 28, 2016

(87) PCT Pub. No.: WO2015/101762
PCT Pub. Date: Jul. 9, 2015

(65) Prior Publication Data
US 2016/0319802 A1    Nov. 3, 2016

(30) Foreign Application Priority Data

Dec. 31, 2013 (GB) .................................. 1323153.5
Nov. 27, 2014 (EP) .................................... 14250119

(51) Int. Cl.
*F03D 13/25* (2016.01)
*F03D 9/25* (2016.01)
(Continued)

(52) U.S. Cl.
CPC .............. *F03D 13/25* (2016.05); *B63B 35/44* (2013.01); *B63B 39/00* (2013.01); *B63B 39/02* (2013.01);
(Continued)

(58) Field of Classification Search
CPC ........ F03D 13/25; F03D 7/0204; B63B 35/44
(Continued)

(56) References Cited

U.S. PATENT DOCUMENTS

2012/0114486 A1* 5/2012 Ehrnberg ................. F03G 3/08
416/86
2012/0171034 A1* 7/2012 Gabeiras ............... F03D 7/0204
416/1
2013/0302139 A1   11/2013 Wittrisch

FOREIGN PATENT DOCUMENTS

FR         2984968 A1     6/2013
GB         2400823 A      10/2004
(Continued)

*Primary Examiner* — Woody A Lee, Jr.
*Assistant Examiner* — Michael L Sehn
(74) *Attorney, Agent, or Firm* — James Creighton Wray

(57) ABSTRACT

The generation of electricity is described, using an offshore wind turbine. A generating sub-assembly 101 is supported by support mechanism (103) upon a support structure 102. The generating sub-assembly has a wind-responsive turbine and an electrical generator. The support structure includes a buoyancy portion (106) for submersion in water and a mast portion (108) extending from said buoyancy portion to extend the generating sub-assembly above the waterline. The support structure is buoyant and is free to roll when floating in water and the support mechanism is hinged to allow the generating sub-assembly to maintain an operational angle during the rolling of the support structure.

13 Claims, 5 Drawing Sheets

(51) Int. Cl.
*F03D 1/00* (2006.01)
*B63B 35/44* (2006.01)
*B63B 39/00* (2006.01)
*B63B 39/02* (2006.01)
*F03D 1/06* (2006.01)
*F03D 7/02* (2006.01)
*B63B 17/00* (2006.01)

(52) U.S. Cl.
CPC ................. *F03D 1/00* (2013.01); *F03D 1/06* (2013.01); *F03D 7/0204* (2013.01); *F03D 9/25* (2016.05); *B63B 2017/0072* (2013.01); *B63B 2035/446* (2013.01); *F05B 2240/93* (2013.01); *F05B 2240/95* (2013.01); *F05B 2240/97* (2013.01); *F05B 2250/411* (2013.01); *Y02E 10/721* (2013.01); *Y02E 10/727* (2013.01)

(58) Field of Classification Search
USPC .......................................................... 290/55
See application file for complete search history.

(56) References Cited

FOREIGN PATENT DOCUMENTS

| GB | 2480000 A | 11/2011 |
|---|---|---|
| WO | 0309808 A1 | 11/2003 |
| WO | 2010098814 A1 | 9/2010 |
| WO | 2010120186 A1 | 10/2010 |
| WO | 2012171578 A2 | 12/2012 |

* cited by examiner

OFFSHORE WIND TURBINE

CROSS REFERENCE TO RELATED APPLICATIONS

This application claims priority from United Kingdom Patent Application No. 13 23 153.5 filed 31 Dec. 2013, the entire disclosure of which is incorporated herein by reference in its entirety.

BACKGROUND OF THE INVENTION

1. Field of the Invention

The present invention relates to an apparatus for generating electricity, of the type comprising a generating sub-assembly and a support structure for supporting said generating sub-assembly.

The present invention also relates to a method of generating electricity.

2. Description of the Related Art

It is known to use wind turbines to generate electricity, and it is also known for these wind turbines to be positioned offshore. Known systems may be fixed or may float, but each incorporates a fixed platform that can introduce difficulties. Difficulties exist in terms of establishing structures of this type at sea, particularly in deep water. Furthermore, they are prone to fatigue because a rigid fixed structure will attract and absorb vibrations induced by wind and turbine operation. The introduction of this fatigue will reduce the operational lifespan of the device.

It is also known that a fixed structure must be fixed or tied to the seabed, such that it will require substantial deep foundations, thereby limiting positions where systems of this type may be installed.

BRIEF SUMMARY OF THE INVENTION

According to an aspect of the present invention, there is provided an apparatus for generating electricity, comprising: a generating sub-assembly; a support structure for supporting said generating sub-assembly; and a support mechanism for securing the generating sub-assembly to said support structure; wherein: said generating sub-assembly has a wind-responsive turbine and an electrical generator; said support structure includes a buoyancy portion for submersion in water and a mast portion extending from said buoyancy portion to extend the generating sub-assembly above a water line; said support structure is buoyant and free to roll when floating in water; said support mechanism is hinged so as to allow the generating sub-assembly to maintain an operational angle during the rolling of said support structure; and said mast portion comprises: an elbow; a first section below said elbow inclined at a first angle away from said turbine; and a second section above said elbow inclined at a second angle towards said turbine.

In an embodiment, the centre of gravity of the generating sub-assembly is below the position of the hinge.

According to a second aspect of the present invention, there is provided a method of generating electricity, comprising the steps of: locating a buoyant support structure in water, such that said buoyant support structure is free to roll in said water; and supporting a generating sub-assembly upon said support structure by a hinged mechanism, so that said generating sub-assembly is rotatable about said hinge so as to maintain an operational angle for a turbine forming part of said generating sub-assembly during the rolling of the buoyant support structure; wherein said support structure includes a mast portion comprising an elbow; a first section below said elbow inclined at a first angle away from said turbine; and a second section above said elbow inclined at a second angle towards said turbine.

DETAILED DESCRIPTION OF EXAMPLE EMBODIMENTS

FIG. 1

Figure 1:
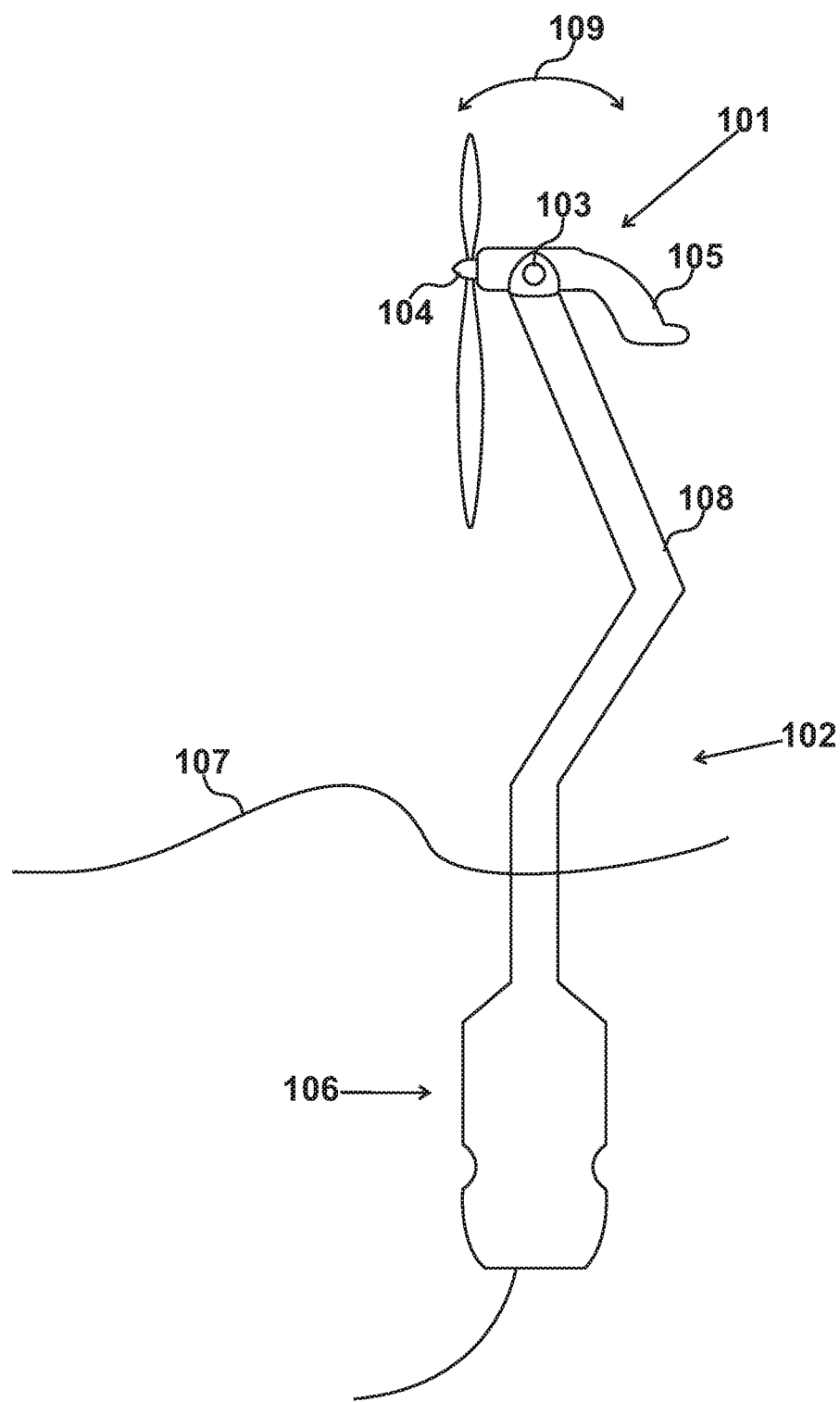
FIG. 1 shows an apparatus for generating electricity.
Figure 2:
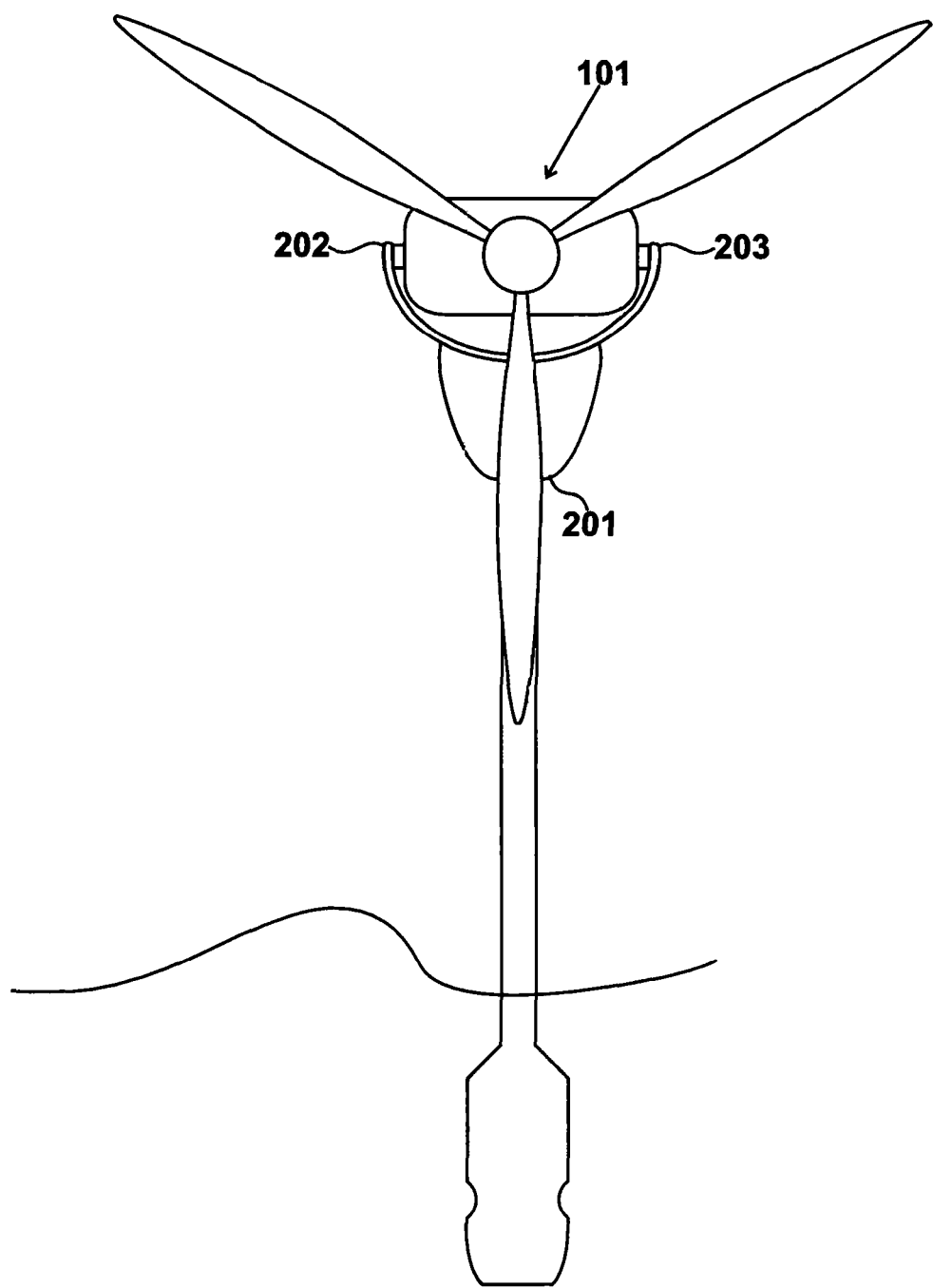
FIG. 2 shows an alternative view of the apparatus of FIG. 1.

An apparatus for generating electricity is shown in FIG. 1. The apparatus has a generating sub-assembly 101 a support structure 102 for supporting the generating sub-assembly 101 and a support mechanism 103 for securing the generating sub-assembly to the support structure.

The generating sub-assembly 101 has a wind-responsive turbine 104 and an electrical generator 105.

The support structure 102 includes a buoyancy portion 106 for submersion in water; water level is indicated at 107. The support structure 102 also includes a mast portion 108 extending from the buoyancy region 106 to extend the generating sub-assembly 101 above waterline 107. In this way, the support structure 102 is buoyant and free to roll when floating in water. Furthermore, the support mechanism 103 is hinged so as to allow the generating sub-assembly to maintain an operational angle during the rolling of said support structure. Thus, the generating sub-assembly 101 is free to roll in a direction indicated by arrow 109.

The embodiment shown in FIG. 1 addresses issues of rigidity by introducing a free floating system that is free to move or rotate. It is therefore far less prone to fatigue damage. Furthermore, the embodiment also addresses difficulties in relation to the installation of foundations by presenting a floating system that is not sitting on, or tied rigidly to, the seabed. The apparatus of FIG. 1 is able to rotate freely in a manner that may be described as a pendulum floating in water. It has been identified as "free floating" or "rotationally free floating".

The inverted pendulum apparatus of FIG. 1 is self adjusting with respect to its vertical position; its vertical alignment is based on the principle of buoyancy, with its centre of gravity being lower than its centre of buoyancy.

The generating sub-assembly is supported on a substantially horizontal hinge system, while being self adjusting with respect to the vertical alignment; so as to maintain the correct heading to the horizontal, based on the counterweight. It is also stabilised, when rotating, due to the gyroscopic effect.

FIG. 2

The generating sub-assembly 101 includes a rotor ballast 201, in this embodiment, to ensure that the centre of gravity of the generating sub-assembly is below the position of its supporting hinge. Thus, the hinge of the support mechanism 103 locates the generating sub-assembly at a first position 202 and at a second position 203. Thus, in this embodiment, the rotor ballast 201 provides an extension that descends below hinge positions 202 and 203 so as to lower the centre of gravity of the generating sub-assembly 101.

FIG. 3

Figure 3:
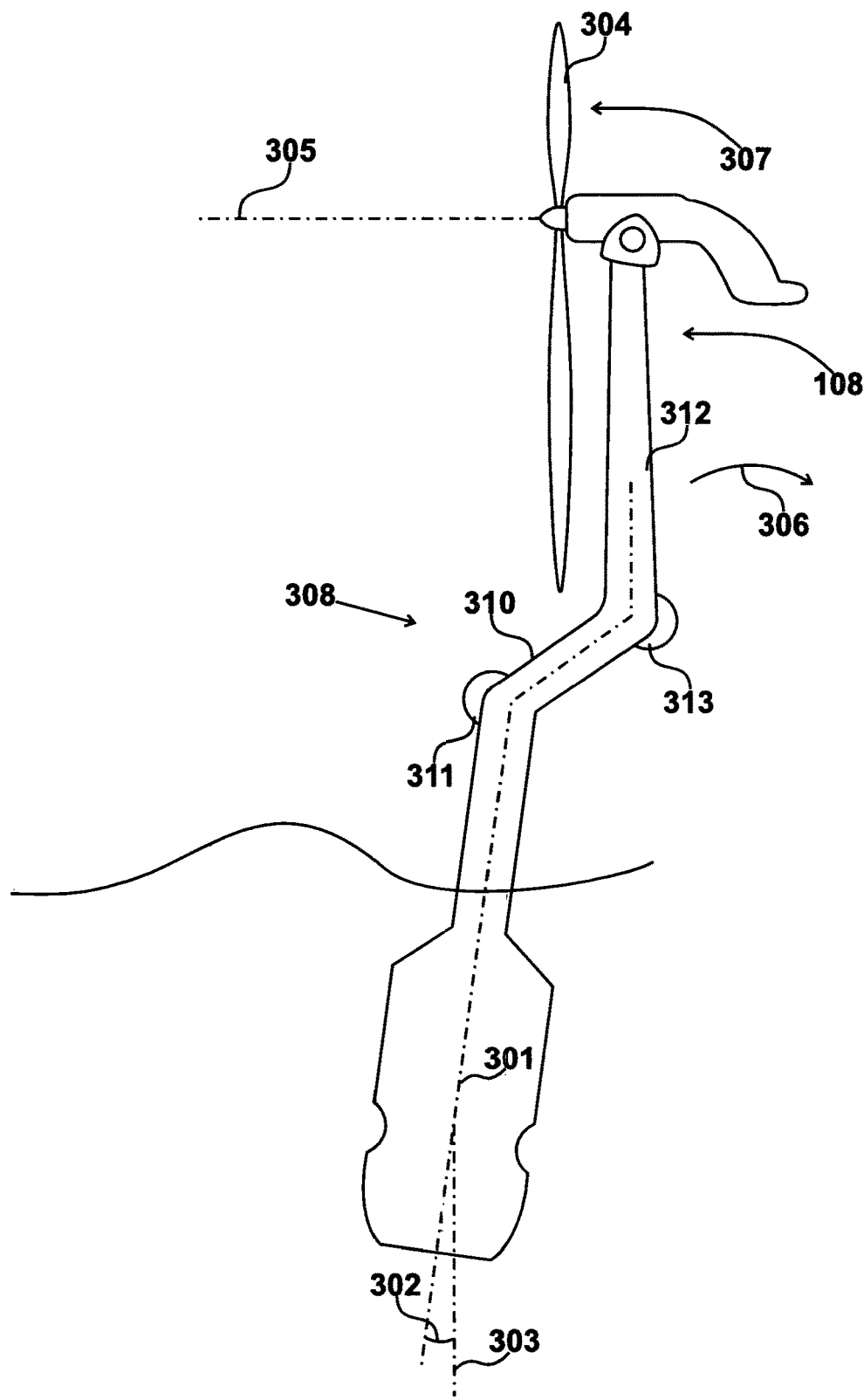
FIG. 3 shows the apparatus of FIG. 1 performing a backwards roll.

The apparatus of FIG. 1 is shown in FIG. 3, having rolled such that a central axis 301 now defines a roll angle 302 with respect to a vertical axis 303.

In this embodiment, the generating sub-assembly includes three rotor blades, including rotor blade 304. The rotor blades rotate within a plane that should be perpendicular to the direction of the wind. Thus, a rotor axis 305, perpendicular to the plane of the rotor blade 304, defines the attitude of the rotors.

In the example shown, due to roll, the mast portion 108 has swung backwards in the direction of arrow 306. To compensate for this, while maintaining attitude, the generating sub-assembly 101 has rotated in the direction of arrow 307.

To facilitate the backward roll, as shown in FIG. 3, the mast potion 108 is substantially J-shaped; thereby allowing rotation to occur while maintaining clearance between the mast and the rotating blades.

In the embodiment of FIG. 3, the mast portion includes an elbow 308. The mast portion therefore defines a first section 310 below the elbow 308 and inclined at a first angle 311 taking the mast portion away from the position of the turbine blade 304.

Above elbow 308, the mast portion defines a second section 312 that is inclined at a second angle 313 returning the mast portion 108 back towards the turbine blade 304.

FIG. 4

Figure 4:
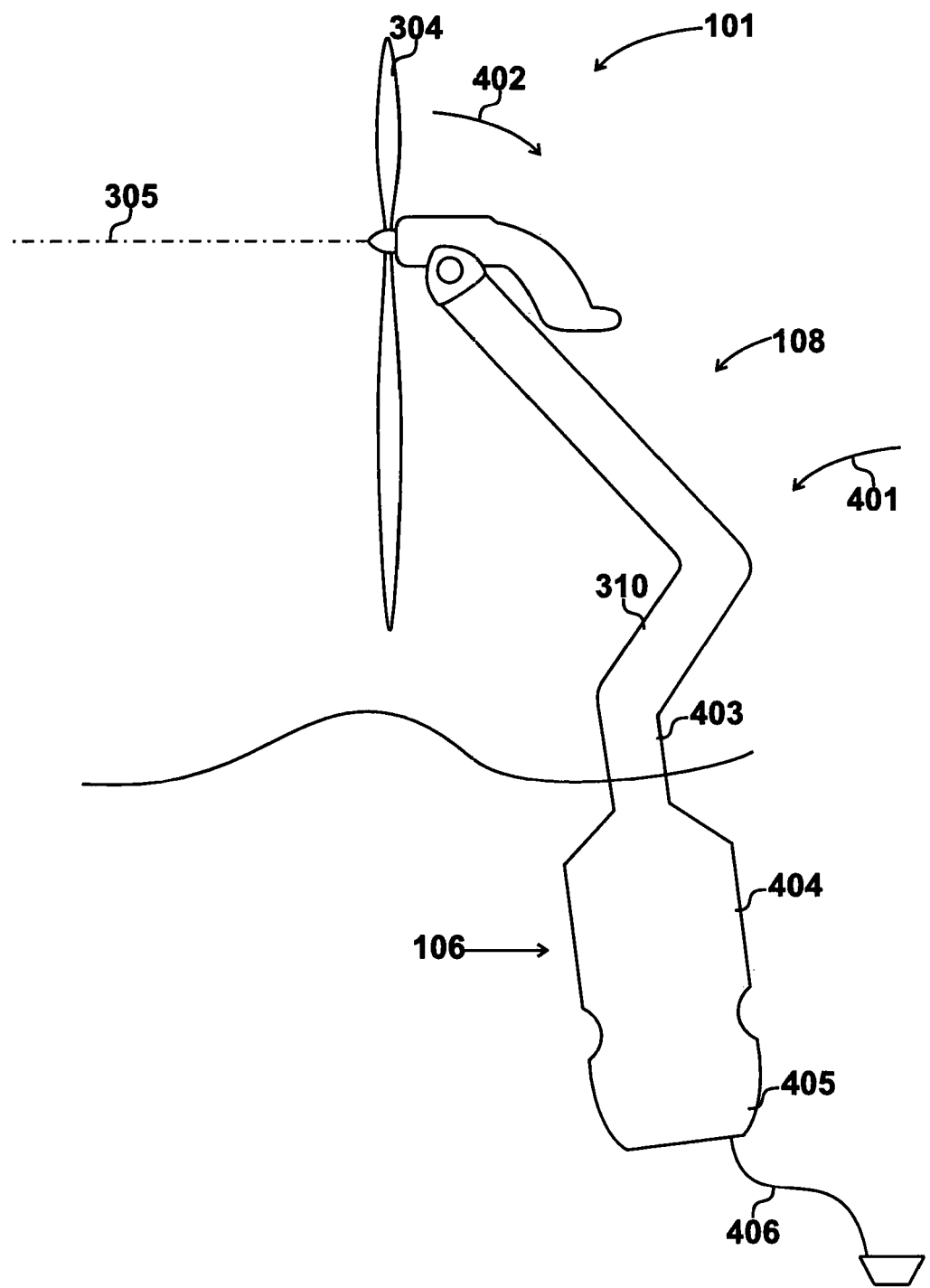
FIG. 4 shows the apparatus of FIG. 1 performing a forwards roll.

The apparatus of FIG. 1 is shown in FIG. 4, after the support structure 108 has rolled forward in the direction of arrow 401. In response to this roll, the generating sub-assembly 101 has rotated in the direction of arrow 402, such that the attitude of rotor blade 304 is maintained in horizontal axis 305.

As illustrated in FIG. 4, the mast portion includes a vertical section 403 extending between the buoyancy portion 106 and the first section 310.

The buoyancy section 106 includes a buoyancy tank 404. In this embodiment, the buoyancy tank contains air; although other gases could be used or the buoyancy area could be filled with lightweight material such as polystyrene. The buoyancy tank 404 may be defined by inflatable structures. In the embodiments described, the overall structure is defined by steel sheeting. However, in alternative configurations, more of the substructure could be defined by inflatable units.

In the embodiment shown in FIG. 4, the buoyancy portion 106 also includes a ballast tank 405, located below the buoyancy tank 404.

To establish a structure of the type described with reference to FIGS. 1 to 4, to perform a method of generating electricity, the buoyant support structure is located in water, such that it is free to roll in the water. The structure supports a generating sub-assembly, secured upon the support structure by a hinged mechanism. In this way, the generating sub-assembly is rotatable about the hinge to maintain an operational angle for a turbine (forming part of a generating sub-assembly) during the rolling of the buoyant support structure.

In an embodiment, a tether 406 is attached to the buoyant support structure to maintain the location of the structure, while still permitting the structure to roll.

Structures of this type, subject to vibrations, usually require a reliable and sufficient level of damping. In this application, substantial damping is achieved by the presence of the water surrounding the floating structure.

As illustrated in the Figures, a substantial proportion of the structure is located below the surface of the water and hence below any waves; the overall exposure to waves is therefore minimal.

As a floating object, the structure will have a natural frequency for overall movement, far lower than resonant frequencies for fixed structures. Given the low value of this natural frequency, it will not interact with turbine frequencies and will therefore have minimum effect on turbine operation.

FIG. 5

Figure 5:
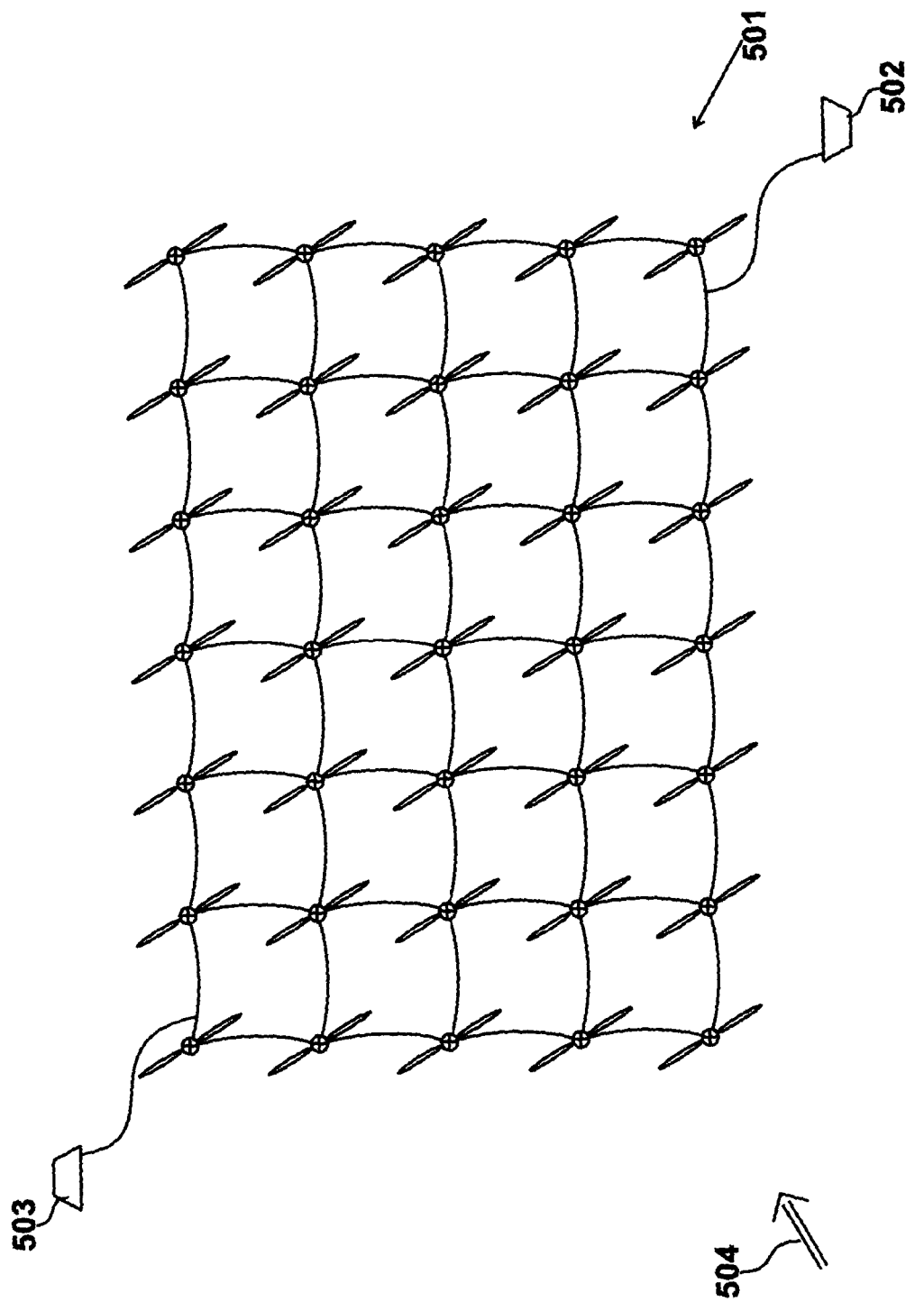
FIG. 5 shows an array of electricity generating devices.

As illustrated in FIG. 5, it is possible to arrange the support structures in an array 501. Thus, individual units may be restrained vertically and/or horizontally by means of a tie anchor; either to the ground or to adjacent structures. Thus, in the configuration shown in FIG. 5, many of the devices are held in place by being tied to adjacent structures within the array.

In the example, an anchor point may be made to a first structure at location 502 and again at a location connected to a second structure 503. In the example, oncoming wind is shown blowing in the direction of arrow 504. Each turbine thereby presents its rotors towards the wind and these positions are maintained while the support structures roll, as described previously.

During installation, ballast may be added, for retention in ballast tank 405, in order to provide the required level of buoyancy and effectively move the centre of buoyancy; this being the centre of the volume of water that the device displaces when floating.

To summarise, the system may be considered as a floating inverted pendulum; therefore it may rotate or move freely to some degree around the point of equilibrium, as distinct from having a ground-fixed foundation. The structure, the ballast and the buoyancy tank can be partially or wholly inflatable, thereby facilitating fabrication and installation.

The apparatus described reduces fatigue problems by introducing an inherently flexible support that is a floating system; the flexible system experiences lower loads compared to a similar rigid system.

The approach overcomes many problems associated with the installation of a foundation on the seabed. The floating pendulum (or inverted pendulum) is self adjusting with respect to vertical alignment, because the centre of gravity is lower then the centre of buoyancy.

The rotor blade sub-assembly is hinged on a horizontal axis and is self adjusting with respect to the horizontal heading. Thus, it remains horizontal to the wind while the supporting floating structure may roll significantly away form vertical alignment. The overall performance is achieved by the presence of the counterweight, in combination with the gyroscopic effect when the rotor blades are operating.

The preferred J-shape introduces a new aesthetic but it also introduces the functionality of ensuring that the blades clear the structure when the structure rolls away from verticality.

The invention claimed is:

1. An apparatus for generating electricity, comprising:
   a generating sub-assembly;
   a support structure for supporting said generating sub-assembly; and
   a support mechanism for securing the generating sub-assembly to said support structure;
   wherein:

said generating sub-assembly has a wind-responsive turbine and an electrical generator;

said support structure includes a buoyancy portion for submersion in water and a mast portion extending from said buoyancy portion to extend the generating sub-assembly above a water line;

said support structure is buoyant and free to roll when floating in water;

said support mechanism is hinged by a hinge mechanism and a centre of gravity of the generating sub-assembly is below a position of said hinge mechanism during electricity generation, so as to allow the generating sub-assembly to rotate around a horizontal axis to maintain an operational angle during the rolling of said support structure; and said mast portion comprises: an elbow; a first section below said elbow inclined at a first angle away from said turbine; and a second section above said elbow inclined at a second angle towards said turbine.

2. The apparatus of claim 1, wherein said generating sub-assembly has an extension that descends below said hinge to lower the centre of gravity of the generating sub-assembly during electricity generation.

3. The apparatus of claim 1, wherein said mast portion further comprises a vertical section extending between said buoyancy portion and said first section.

4. The apparatus of claim 1, wherein said buoyancy portion includes a buoyancy tank.

5. The apparatus of claim 4, wherein said buoyancy tank contains air.

6. The apparatus of claim 4, wherein said buoyancy portion includes inflatable structures.

7. The apparatus of claim 1, wherein said buoyancy portion includes a ballast tank.

8. The apparatus of claim 7, wherein said buoyancy portion includes a buoyancy tank and said ballast tank is located below said buoyancy tank.

9. A plurality of the apparatus of claim 1, said plurality being arranged in an array.

10. A method of generating electricity, comprising the steps of:

locating a buoyant support structure in water, such that said buoyant support structure is free to roll in said water; and supporting a generating sub-assembly upon said support structure by a hinged mechanism, wherein a centre of gravity of the generating sub-assembly is below a position of said hinged mechanism during electricity generation, so that said generating sub-assembly is rotatable around a horizontal axis about said hinge so as to maintain an operational angle for a turbine forming part of said generating sub-assembly during the rolling of the buoyant support structure; wherein said support structure includes a mast portion comprising an elbow; a first section below said elbow inclined at a first angle away from said turbine; and a second section above said elbow inclined at a second angle towards said turbine.

11. The method of claim 10, further comprising the step of attaching a tether to said buoyant support structure to maintain the location of said structure while still permitting said structure to roll.

12. The method of claim 10, further comprising the step of arranging a plurality of said support structures in an array.

13. The method of claim 10, further comprising the step of adding ballast to provide the required degree of buoyancy.

* * * * *